Feb. 24, 1970           E. C. CRISWELL          3,496,649
OPTOKINETIC PERCEPTUAL LEARNING DEVICE AND METHOD
FOR STIMULATING SENSORY AWARENESS AND LEARNING
Filed April 18, 1968
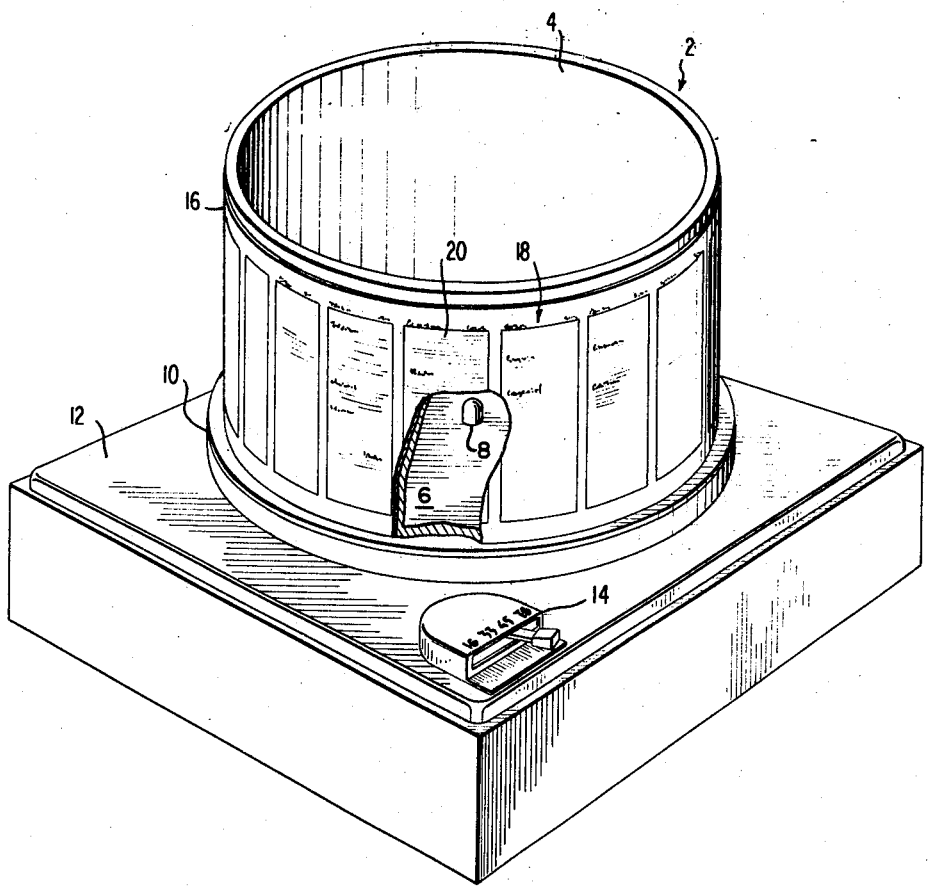
INVENTOR
ELEANOR CAMP CRISWELL
BY
ATTORNEY 3,496,649
OPTOKINETIC PERCEPTUAL LEARNING DEVICE
AND METHOD FOR STIMULATING SENSORY
AWARENESS AND LEARNING
Eleanor Camp Criswell, Gainesville, Fla.
(5022 Rahlves Drive, Castro Valley, Calif. 94546)
Filed Apr. 18, 1968, Ser. No. 722,457
Int. Cl. G09b 1/09
U.S. Cl. 35—1
8 Claims

ABSTRACT OF THE DISCLOSURE

A cylindrical drum, adapted to be mounted on a turntable, is provided around its exterior with exchangeable bands with data displayed thereon, for example, in panels, which data is displayed to the observer as the drum rotates, thereby providing a rapid presentation of a complex visual stimulus and inducing a visual following reflex.

FIELD OF INVENTION

Surgery, orthopedics, eye.

PRIOR ART

Morgan 2,955,509, representative of praxinoscopic devices; Strauss et al. Des. 144,949, showing a decorative drum beneath a phonograph turntable.

OBJECTS

One of the primary objects of this invention is to provide for the stimulation of sensory awareness through the rapid presentation of a complex visual stimulus over sustained time period, by means of a pattern or patterns on a rotating drum. The moving visual stimulus makes use of the optokinetic visual following reflex or response in a horizontal direction so that the visual response is a natural reaction in the most natural direction for eye movement of human vision, which is also the basic eye movement for reading. More specifically, this reflex occasions a horizontal optokinetic nystagmus characterized by a pursuit following eye movement and a rapid return movement so that the nystagmus is actually eye movement in two directions, back and forth, rapidly. The eye movement begins immediately with the initial drum movement. It is thus intended to provide a device for inducing a following eye movement and to therefore stimulate various areas of the brain, and to produce a visual-occipital response to patterned visual presentation, wherein the pattern is regularly changed, and wherein the change in pattern is accompanied by changes or slight flickering of reflected light.

Neurophysiological studies using electrophalo-grams and implanted electrodes indicates that the visually stimulating properties of a design can be found in the contrast between light and dark areas which stimulate "on" and "off" cells in the retina of the eye. The more interfaces between white and black areas or the more edges present in the design, the more visually exciting the design is, as indicated by the evoked brain response as well as by studies using human infants, based upon the amount of time they spend attending to one visual stimulus as opposed to another, indicating interest and stimulation factors as part of attending. The visual stimulus of a design is found more in the density of its interfaces than even the presence of color. For example, a printed page, especially one densely packed with words and moving slowly horizontally is more exciting and visually stimulating than moving pictures or less complex design, colored or uncolored.

Another concept behind this invention has to do with variety or novelty presented to the eye. Assuming that around a drum rotating slowly, for example, at 16 r.p.m. there is arranged a band of panels, each one a densely printed page, like a series of different pages from a dictionary, and with little or no division between the pages or panels. The eye is prevented from finding a resting place in the design. The complexity of the design is an important factor in that it is sufficiently varied in presentation to prevent the monotony effect from being present, assuming that with any given subject the same band is not used to often because the subject habituates to it, i.e., he grows used to it, which is a function of the learning process, and the design becomes less visually exciting.

If the entire visualization process be reduced to a rapid dynamic complex presentation of a complex visual stimulus, the following results ensue: Repeated presentations of a stimulus, such as visual sensory input, is transduced by the retina into electrical impulses which are sent partly to the occipital lobe and partly to the reticular activating system and diffuse thalamic activating system which serve the function of alerting the organism and regulating the level of activation of the organism and, therefore, the level of awareness, consciousness, and attention. These activating impulses are then sent back up to the cortex to various areas to enhance the function of that area. With repeated stimulation, the level of activation continues to rise with each new stimulus. There is a recruiting of neurons and a summation of effects. Because this is the basic activating core of the central nervous system, all senses that have collateral or connections with the RAS (reticular activating system) are awakened as the cortex is toned up and prepared for action in whatever mode is necessary. When a certain level of function is achieved, there are established reverberating circuits which continue to trigger each other for a period of time outlasting the original sensory input by a period of time depending upon the level reached by the summation of the stimulation. Hence, it is an object to provide not only for the stimulation of temporal sensory awareness, but also for an after response effect which, in the case of a patterned drum whose rotation in one direction has been stopped, manifests itself in an apparent movement in the reverse direction, as well as all other objects viewed at this time.

A further object of the invention is to provide for the enhancement of reading level and ability as well as comprehension and concentration. By the provision of a perceptual learning device which teaches ways of perceiving as well as learning the material on a drum simply by watching it as it is repeatedly presented in a highly alerting situation. By placing vocabulary and other intellectual concepts on the bands of the rotating drum, such concepts may be put into a subject's mind by the learning process entailed with repetitive exposure, and desirable habits of eye movement may be instilled.

Other uses include the enhancement of mood level in hospital patients, and use in connection with EEG laboratory work. In this latter connection, one of the variables in evaluating EEG measurements entails the subject's stimuli at the time the measurements are made. By providing stimuli of known characteristics, much of the variables can be reduced, and enlightening comparisons can be made between the EEG patterns of a number of subjects exposed to the same stimuli.

These and other objects will be apparent from the following specification and drawing, in which the sole figure is a perspective view showing the device in typical operatve envronment.

Referring now to the drawing, the optokinetic perceptual learning device 2 consists in a sight-cylindrical drum 4 having a bottom 6 provided with a center hole 8 for fitting over the spindle of a turntable 10. The turntable may be that of an ordinary phonograph 12 having a speed-selection adjustment, such as the four-speed lever 14, which provides a standard selection of 16 r.p.m., 33⅓ r.p.m., 45 r.p.m. and 78 r.p.m. A continuously variable speed adjustment could be provided as could an adjustment for varying the standard speeds plus or minus a few r.p.m.'s.

Fitted around drum 4 is removable band 16 which can be made of paper, plastic or the like, with a white background, the band, in this example, being divided into panels 18 having a dense array of indicia 20 thereon. Also in this example, indicia 20 are black printed words, the panels 18 being densely printed pages of a dictionary, which pages are two columns of words wide, the pages being arranged closely enough together to provide no wider white space between them than the white spaces between the word columns. It will be understood that a number of different bands 16 are to be provided, each with different indicia, their common important characteristic being that they, on the background, provide a vast number of contrast interfaces. As on any ordinary dictionary page, the words to be defined may be in bold type and the defining words in lighter type, although this is not critical. This example is typical of a band used for learning. Other types of learning bands may be used, as for example, where the indicia would be a foreign language vocabulary. For teaching reading, meaningful phases could be arrayed across the panels, and for EEG tests or sensory-sharpening effects, or even simple amusement, the indicia could be symbols without established meaning.

In operation, the subject is seated facing the drum in a good light and is instructed to gaze intently, but in a relaxed manner, at the indicia which are presented as the drum rotates, for example, at 16 r.p.m., and to count subvocally, such as "one—I am, two—I am," etc. through ten, the purpose of this being to block out initial reading response until the data design present themselves fully, without editing out part of it in the discriminating reading response. This method of counting seems to facilitate the process in that the subject's attention is alertly fixed on the data presented as a whole, plus there is self-identification of the subject with the data and the design thereof. Ordinarily, after a session of ten minutes following the initial counting period, which counting may be prolonged further into the session, there should be a pause to allow the subject to experience the after effects of the stimulation. The band should be changed periodically, such as every third session to retain novelty. A one to five minute period of observation with the drum rotating at 33⅓ r.p.m. is essential to finish the stimulation. A session once a day is sufficient, since the alerting sensory awareness effects lasts for several hours.

Experimental subjects report various sensations such as enhanced hearing activity, heightened visual sensory awareness for color, increased ability to read at higher speed and comprehension, and, in general, a heightening of intellectual functions.

I claim:
1. An optokinetic learning device comprising a right cylindrical drum adapted to be mounted on a variable-speed turntable,
   a band on the exterior of said drum and providing a right-cylindrical outer surface,
   the band being open and unmasked whereby substantially an entire hemi-cylinder is presented to an observer,
   said band having on said outer surface a white background with densely arranged dark indicia thereon arranged about the periphery thereof and providing a substantially continuous pattern of dark and white interfaces between the indicia and said background.
2. The combination claimed in claim 1, said band comprising an annular continuous strip of material removably engaged on the exterior of said drum.
3. The combination claimed in claim 2, said indicia being printed words arranged in panels around the periphery of said band.
4. The combination claimed in claim 3, said back ground being white and said printed words being in black type.
5. The method of stimulating sensory awareness in a subject, comprising,
   initially passing in a circular path at a predetermined speed a band of densely printed black indicia on a white background before the eyes of the subject under light conditions and under conditions conducive to produce concentration of the subject's attention to the indicia,
   then repetitively passing said indicia in the same circular path until an indicia-following reflex accompanied by a rapid-return movement is induced in the subject's eyes,
   and thereafter continuing to pass said band before the subject's eyes under the aforesaid conditions until the subject's sensory awareness is enhanced.
6. The method recited in claim 5, wherein the indicia comprise words and definitions thereof.
7. The method claimed in claim 5, wherein the indicia comprise words of meaning to the subject whose intelligence is to be imparted to the subject.
8. The method claimed in claim 5, wherein the printed indicia are arranged in vertical columns and wherein there are white background margins between the columns.

References Cited

UNITED STATES PATENTS

| 346,656 | 8/1886 | Hopkins | 35—35.7 |
| 2,204,435 | 6/1940 | Musaphia | 40—77 X |
| 2,955,509 | 10/1960 | Morgan | 352—2 |

WILLIAM H. GRIEB, Primary Examiner